US009418173B2

(12) United States Patent
Prasad

(10) Patent No.: US 9,418,173 B2
(45) Date of Patent: Aug. 16, 2016

(54) DETECTION OF CROSS-PLATFORM DIFFERENCES OF WEB APPLICATIONS

(75) Inventor: Mukul R. Prasad, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 561 days.

(21) Appl. No.: 13/587,750

(22) Filed: Aug. 16, 2012

(65) Prior Publication Data

US 2014/0052821 A1 Feb. 20, 2014

(51) Int. Cl.
*G06F 15/16* (2006.01)
*G06F 17/30* (2006.01)
*G06F 9/44* (2006.01)

(52) U.S. Cl.
CPC ............ *G06F 17/30905* (2013.01); *G06F 8/38* (2013.01)

(58) Field of Classification Search
USPC .................................. 709/218, 202, 224, 205
See application file for complete search history.

(56) References Cited

U.S. PATENT DOCUMENTS

| 2011/0093773 A1* | 4/2011 | Yee .................. G06F 17/30905 715/235 |
| 2011/0225289 A1 | 9/2011 | Prasad et al. |
| 2012/0210236 A1 | 8/2012 | Prasad |

OTHER PUBLICATIONS

Mesbah et al., "Automated Cross-Browser Compatibility Testing", ICSE 2011, ICSE '11 Proceedings of the 33rd International Conference on Software Engineering, pp. 561-570 , May 21-28, 2012.
Choudhary et al., "WEBDIFF: Automated Identification of Cross-browser Issues in Web Applications", ICSM '10 Proceedings of the 2010 IEEE International Conference on Software Maintenance, pp. 1-10, Sep. 12-18, 2010.
"Scale-invariant feature transform", Wikipedia, The Free Encyclopedia, Wikipedia Foundation, Inc., Aug. 2012, <http://en.wikipedia.org/wiki/Scale-invariant_feature_transform>.
Choudhary et al., "CrossCheck: Combining Crawling and Differencing to Better Detect Cross-browser Incompatibilities in Web Applications", 5th IEEE International Conference on Software Testing, Verification and Validation (ICST 2012) Retrieved on Aug. 16, 2012.

* cited by examiner

*Primary Examiner* — Lan-Dai T Truong
(74) *Attorney, Agent, or Firm* — Maschoff Brennan

(57) ABSTRACT

A method for detecting a cross-platform difference of a web application may include generating a first relative layout model based on a first relationship between multiple elements of a screen of a web application when the web application is executed on a first platform. The method may further include generating a second relative layout model based on a second relationship between the multiple elements of the screen of the web application when the web application is executed on a second platform. The method may also include determining a difference between the first relationship and the second relationship based on a comparison of the first relative layout model with respect to the second relative layout model.

12 Claims, 7 Drawing Sheets

DETECTION OF CROSS-PLATFORM DIFFERENCES OF WEB APPLICATIONS

FIELD

The present disclosure relates to detecting cross-platform differences in web applications.

BACKGROUND

Web applications may be accessed using different platforms such as different operating systems and web browsers. However, a web application executed on different platforms may be presented differently such that different end-user experiences of the same web application may occur.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method for detecting a cross-platform difference of a web application may include generating a first relative layout model based on a first relationship between multiple elements of a screen of a web application when the web application is executed on a first platform. The method may further include generating a second relative layout model based on a second relationship between the multiple elements of the screen of the web application when the web application is executed on a second platform. The method may also include determining a difference between the first relationship and the second relationship based on a comparison of the first relative layout model with respect to the second relative layout model.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

An end-user experience of a web application may differ depending on a platform used to execute the web application. The differences in the end-user experience that depend on different platforms may be based on one or more differences in one or more relationships between elements of one or more screens of the web application as executed by the different platforms. For example, a web application executed on a first platform may be presented such that a first element of a screen of the web application is left-justified with respect to a second element of the screen. However, the same screen of the web application executed on a second platform may be presented such that the first element of the screen is right justified with respect to the second element of the web application. Consequently, the end-user experience of the web application may be different when the web application is executed on the first platform as compared to being executed on the second platform.

Therefore, as detailed below, some embodiments of the present disclosure may be configured to detect cross-platform differences in a web application. In some embodiments, the detection may be performed by generating a first relative layout model based on a first relationship between multiple elements of a screen of the web application when the web application is executed on the first platform. Additionally, a second relative layout model may be generated based on a second relationship between the multiple elements of the same screen of the web application when the web application is executed on the second platform. The first and second relative layout models may accordingly be compared to determine whether one or more differences between the first relationship and second relationship exist. The existence of one or more differences between the first relationship and the second relationship may indicate that the screen (and thus the end-user experience) of the web application executed on the first platform and the second platform may be different. Therefore, one or more differences in the end-user experience between different platforms may be identified such that the one or more differences may be corrected to allow for a more uniform end-user experience of the web application as executed on different platforms.

Embodiments of the present invention will be explained with reference to the accompanying drawings.

Figure 1:
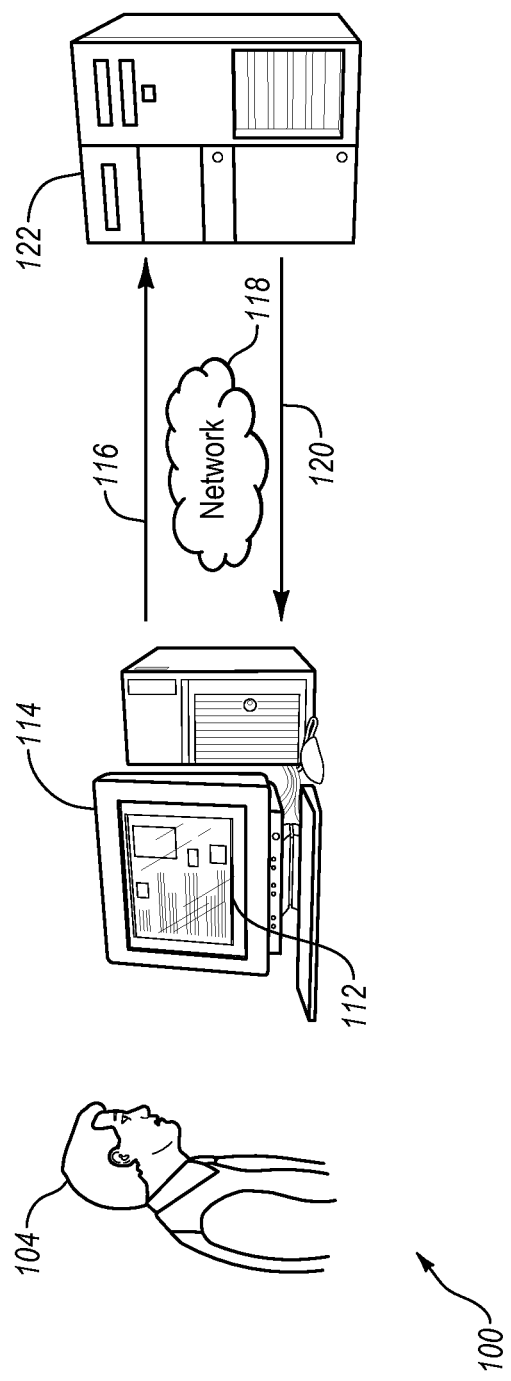
FIG. 1 illustrates an example system for accessing one or more web applications.

FIG. 1 illustrates an example system 100 for accessing one or more web applications 112, arranged in accordance with at least some embodiments described herein. The system 100 may include a user 104, one or more clients 114, one or more web applications 112, a network 118, and one or more servers 122.

The user 104 may interact with the client 114 to access one or more web applications 112. As an example and not by way of limitation, the user 104 may include a person, a program, a device, an automation, any other suitable entity, or any combination thereof.

The client 114 may send signals to and receive signals from the one or more servers 122 to allow the user 104 to access the one or more web applications 112. As an example and not by way of limitation, the client 114 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or any combination thereof. The client 114 may send and receive any suitable type of signals for accessing the web application 112. For example and not by way of limitation, the client 114 may send and receive hypertext transfer protocol (HTTP) signals, file transfer protocol (FTP) signals, or any other suitable signals.

The client 114 may further include an I/O device (not shown) that enables the user 104 to interact with the client 114. As an example and not by way of limitation, an I/O device may include a keyboard, keypad, microphone, monitor, mouse, printer, scanner, speaker, still camera, stylus, tablet, touchscreen, trackball, video camera, another suitable I/O device, or a combination of two or more of these. An I/O interface of the client 114 may provide the user 104 with a viewable display of the web application 112. As an example and not by way of limitation, an I/O interface may be a monitor that provides the viewable display to the user 104 by displaying the web application 112 on the monitor.

The I/O interface and the I/O device of the client 114 may further allow the user 104 to interact with the web application 112 by allowing the user 104 to perform one or more events. An event may include any suitable type of user-initiated event. As an example and not by way of limitation, an event may include clicking a mouse, moving a mouse, pressing one or more keys on a keypad, touching a touchscreen, moving a trackball, speaking into a microphone, any other event that may be initiated by the user 104, or any combination of two or more of these.

The client 114 may further include one or more platforms (not shown). A platform of the client 114 may allow the user 104 to access the one or more web applications 112. As an example and not by way of limitation, a platform may include an operating system (OS) installed on the client 114, a web browser installed on the client 114, one or more settings of the client 114 (e.g., such as the screen resolution of a monitor of the client 114), one or more variations in a web browser installed on the client 114 (e.g., the version and configuration of the web browser, including one or more web browser plug-ins and one or more web browser settings), or any combination of two or more of these.

An OS installed on the client 114 may run one or more web browsers installed on the client 114. As an example and not by way of limitation, an OS may include a Windows® 95/98/NT/XP/Vista/7/Mobile OS, an OS-X® OS, a UNIX® OS, a LINUX OS, or any other suitable OS. A web browser installed on the client 114 may allow the user 104 to access the one or more web applications 112. For example and not by way of limitation, the web browser may include Microsoft® Internet Explorer, Mozilla Firefox®, Google® Chrome, Opera® or any other suitable web browser. In some embodiments, the web browser may initiate the transmittal of a server request signal 116 from the client 114 to one or more servers 122 over the network 118. The server request signal 116 may be based on the one or more events from the user 104 or web flow from the web application 112.

As an example and not by way of limitation, the user 104 may enter an address for the web application 112 (e.g., such as a uniform resource locator (URL) or a uniform resource indicator (URI)) into an address box of the web browser, and the web browser may send the server request signal 116 to the server 122 to request content from the web application 112. In particular embodiments, the server 122 may respond to the server request signal 116 by transmitting a server response signal 120, which includes content corresponding to the web application 112, to the web browser in the client 114. After receiving the content, the web browser may render the content into a viewable form so that it may be displayed to the user 104 through the I/O interface of the client 114.

The web application 112 may provide one or more media objects for the user 104 to interact with. As an example and not by way of limitation, the web application 112 may include a web 2.0 application, an AJAX-based web application, or any other suitable application that provides media objects. In particular embodiments, the web application 112 may be run on the server 122 and interacted with by the user 104 through the browser on the client 114. For example and not by way of limitation, content for the web application 112 may be sent to the web browser in a programming language, and the web browser may render the programming language viewable on a display so that the user 104 may interact with the web application 112. In particular embodiments, the web application 112 may include one or more actionable elements that may be executed by the web browser.

The media objects provided by the web application 112 may be changed (e.g., such as by adding, removing, or modifying the media objects) by the one or more events or web flow from the web application 112. As an example and not by way of limitation, the user 104 may enter data using a keyboard, causing the web application 112 to change the media objects provided to the user 104. In particular embodiments, when the web application 112 changes the media objects, the altered media objects may be provided to the user 104 as a new screen (or state).

The web application 112 may include any suitable programming language or combination of programming languages. In particular embodiments, the web application 112 may include source code or object code. In particular embodiments, the web application 112 may include a higher-level programming language, such as, for example, C, Perl, Java or a suitable extension thereof. In particular embodiments, the web application 112 may include a lower-level programming language, such as assembly language (or machine code). In particular embodiments, the web application 112 may include Hyper Text Markup Language (HTML), Extensible Markup Language (XML), Javascript (JS), Java Server Pages (JSP), Hypertext Preprocessor (PHP), or other suitable markup language.

The network 118 may be configured to connect one or more clients 114 to the one or more servers 122 and to transporting one or more signals to and from the one or more clients 114 and the one or more servers 122. The network 118 may include any interconnecting system capable of transmitting audio, video, signals, data, messages, or any combination of the preceding. The network 118 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. The network 118 may transport any suitable signal for accessing the web application 112 on the one or more servers 122. For example and not by way of limitation, the network 118 may transport HTTP signals, FTP signals, or any other suitable signals.

The server 122 may store the one or more web applications 112, and may further send signal to and receive signals from the one or more clients 114 in order to allow the user 104 to access the one or more web applications 112 stored in the server 122. As example and not by way of limitation, the server 122 may be an embedded computer system, a system-on-chip (SOC), a single-board computer system (SBC) (such as, for example, a computer-on-module (COM) or systemon-module (SOM)), a desktop computer system, a laptop or notebook computer system, an interactive kiosk, a mainframe, a mesh of computer systems, a mobile telephone, a personal digital assistant (PDA), a server, or a combination of two or more of these.

In particular embodiments, the server 122 may receive the one or more server request signals 116 from the web browser installed on the client 114. The server 122 may respond to the server request signal 116 by transmitting the server response signal 120 that includes content corresponding to the web application 112 to a web browser in the client 114. The server 122 may send and receive any suitable signals in order to allow the client 114 to access the web application 112. For example and not by way of limitation, the server 122 may send and receive HTTP signals, FTP signals, or any other suitable signals.

In particular embodiments, the web application 112 may be executed on different platforms. For example and not by way of limitation, the web application 112 may be executed on a first platform that includes a Microsoft® Internet Explorer web browser, and the same web application 112 may also be executed on a second platform that includes a Mozilla® Firefox web browser. As mentioned above, although the same web application 112 may be executed on both platforms, an end-user experience of the web application 112 may be different on each platform. Such differences may be caused by one or more of the OS's installed on the client 114, one or more browsers installed on the client 114, any other numerous differences in the platforms, or any combination of two or more of these.

These different end-user experiences may cause problems because the web application 112 may modify the content provided based on the one or more events that occur. For example and not by way of limitation, the web application 112 may modify its content based on a user scrolling over certain content in the web application 112. However, if the content is displayed differently in certain platforms (or not displayed at all) the event may never occur, and the content may not be modified—causing further differences in the end-user experience As such, even minor differences in an end-user experience may turn into much bigger differences in an end-user experience between different platforms.

Accordingly, as detailed below, differences between a web application executed on different platforms may be determined according to some embodiments of the present disclosure. For example, behavioral models of a web application when the web application is executed on different platforms may be generated. In some embodiments, each behavioral model may include a relative layout model that may indicate one or more relationships between elements of a screen of the web application when the web application is executed on the platform associated with the behavioral and/or relative layout model. In the same or alternative embodiments, each behavioral model may indicate an absolute position and/or size of one or more structural elements of the screen of the web application (e.g., elements included in a layout of the screen), an image representation of one or more structural elements of the screen of the web application, a textual representation of one or more textual elements of the screen of the web application, and/or a behavior of one or more actionable elements of the screen of the web application.

Two or more behavioral models of the web application associated with different platforms may be compared to determine whether there are one or more differences within the web application when the web application is executed on the different platforms. In some embodiments, the relative layout models of the behavioral models may be compared to determine if there is a difference in the one or more relationships between elements of a screen of the web application when the web application is executed on the different platforms associated with the respective behavioral models. These relationships may represent the relative arrangement of elements on the layout of one or more screens of the web application. In the same or alternative embodiments, the behavioral models may be compared to determine differences between the absolute position and/or size of one or more structural elements of the screen of the web application, the image representation of one or more structural elements of the screen of the web application, the textual representation of one or more textual elements of the screen of the web application, and/or the behavior of one or more actionable elements of the screen of the web application when the web application is executed on the different platforms associated with the respective behavioral models. Accordingly, cross-platform differences of the web application may be determined.

Figure 2:
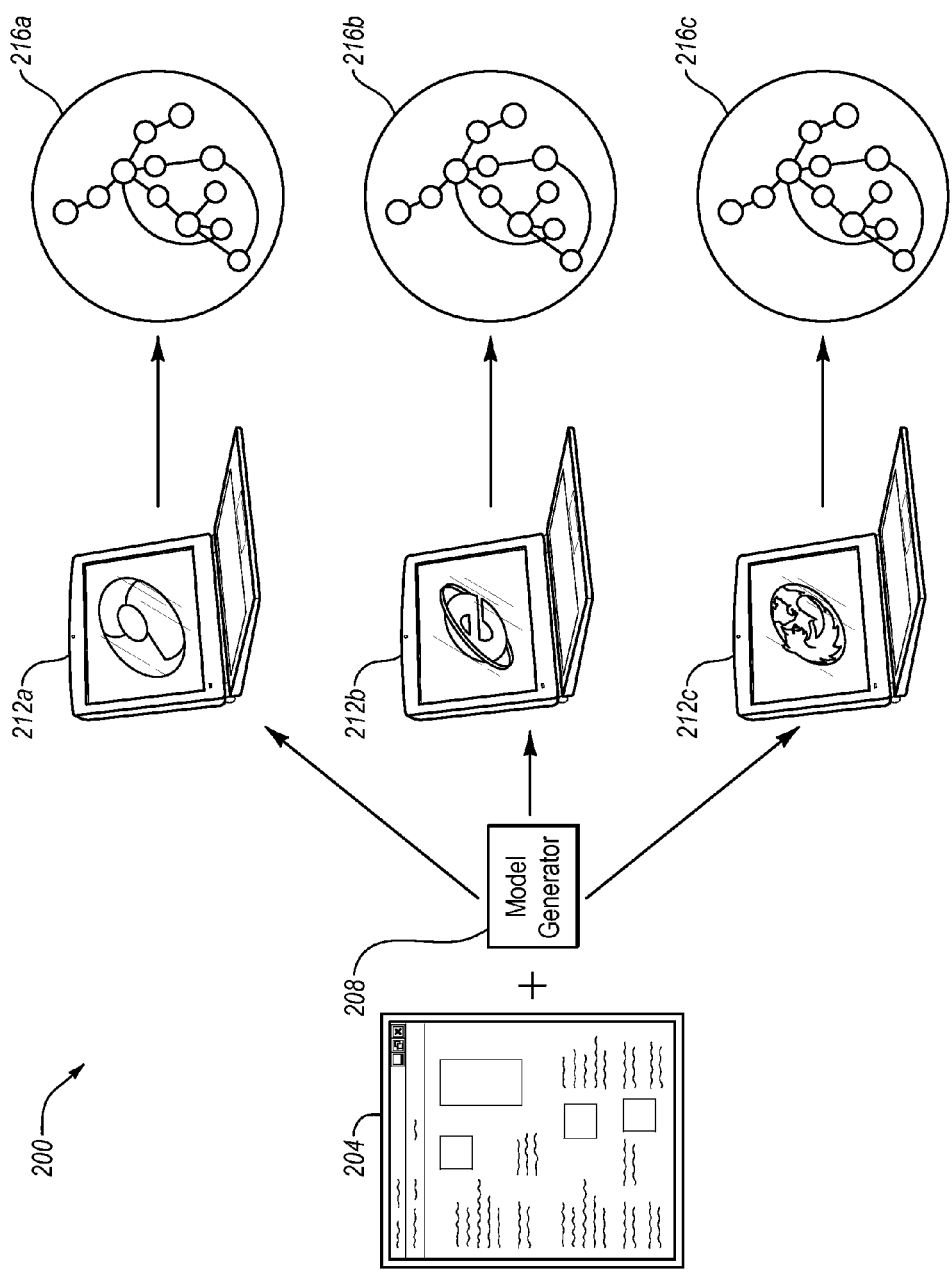
FIG. 2 illustrates an example system for generating one or more behavioral models of a web application.

FIG. 2 illustrates an example system 200 for generating one or more behavioral models 216 of a web application 204, arranged in accordance with at least some embodiments described herein. In particular embodiments, each of the one or more behavioral models 216 may be generated for the web application 204 in one of multiple platforms 212 using a model generator 208.

The web application 204 of FIG. 2 may be similar to the web application 112 of FIG. 1. As such, the web application 204 may provide one or more media objects for a user to interact with.

The platforms 212 may execute one or more the web application 204 to be accessed at a client. In particular embodiments, the platforms 212 may be similar to the platform of FIG. 1. For example and not by way of limitation, the platforms 212 may include an operating system (OS) installed on a client, a web browser installed on a client, one or more settings of a client (e.g., such as the screen resolution of a monitor of a client), one or more variations in the web browser installed on a client (e.g., the version and configuration of the web browser, including one or more web browser plug-ins and one or more web browser settings), or any combination of two or more of these.

In the illustrated embodiment, the system 200 includes three platforms 212. In particular embodiments, each of the platforms 212 may be different. For example and not by way of limitation, a platform 212a may include a Windows® Vista OS and a Google® Chrome web browser; a platform 212b may include a Windows® XP OS, a Microsoft® Internet Explorer web browser, and a particular screen resolution; and a platform 212c may include a UNIX® OS, a Mozilla® Firefox web browser, and one or more plug-ins for the web browser. Although the system 200 illustrates three platforms 212, the system 200 may include more than three platforms 212 or less than three platforms 212. Additionally, the platforms 212 may be different than those described.

According to the illustrated embodiment, the model generator 208 may be configured to load the web application 204 on the platforms 212 and may generate the respective behavioral models 216 for the web application 204 as executed on each platform 212. For example, the model generator 208 may load the web application 204 on the platforms 212a, 212b, and 212c and may generate the behavioral models 216a, 216b, and 216c that may be associated with the web application 204 being respectively executed on the platforms 212a, 212b, and 212c.

The model generator 208 may be configured such that the behavioral models 216 may include a relative layout model that may indicate one or more relationships between elements of a screen of the web application 204 when the web application 204 is executed on the respective platforms 212. These relationships may represent the relative arrangement of elements on the layout of one or more screens of the web application 204. For example, the behavioral model 216a may include a relative layout model that may indicate one or more relationships between elements of the screen of the web application 204 when the web application 204 is executed on the platform 212a; the behavioral model 216b may include a relative layout model that may indicate one or more relationships between elements of the screen of the web application 204 when the web application 204 is executed on the platform 212b; and the behavioral model 216c may include a relative layout model that may indicate one or more relationships between the layout of elements of the screen of the web application 204 when the web application 204 is executed on the platform 212c. A more detailed description of the generation of the relative layout model is given below with respect to FIGS. 3 and 4.

In some embodiments, the model generator 208 may include a crawler (not expressly depicted) configured to dynamically crawl the web application 204 in each of the platforms 212 in order to analyze transitions between screens of the web application 204 when the web application 204 is executed on each platform 212. For example and not by way of limitation, the crawler may include Crawljax, WebCrawler, Methabot, Googlebot, or any other suitable crawler. In particular embodiments, the crawler may exercise code on a client (e.g., such as client 114 of FIG. 1) in order to detect and execute one or more doorways (e.g., clickables) of the web application 204. As such, in particular embodiments the crawler may dynamically analyze one or more screens of the web application 204 that are rendered by the platforms 212. Furthermore, the crawler may analyze how the one or more executed doorways affect the one or more rendered screens of the web application 204. In particular embodiments, this may involve replicating (or firing) one or more events (e.g., clicking on a mouse, typing on a keyboard), in order to analyze how such events affect a dynamic Document Object Model (DOM) tree in a platform before and after the event is replicated.

In some embodiments, the behavioral models 216 may indicate the transitions between screens of the web application 204 when the web application 204 is executed on a particular platform 212 based on the crawl performed by the crawler. In particular embodiments, the crawling conducted by the crawler may be performed in an identical fashion for each platform 212. As an example and not by way of limitation, the crawler may replicate the same events (and do so in the same order) while crawling the web application 204 on each platform 212. As such, the only differences in screens and screen transitions indicated by the behavioral models 216 (if there are any at all) may be caused by the different platforms 212.

In some embodiments, one or more of the behavioral models 216 may include a finite state machine (FSM) with partial transition functions to indicate multiple screens and transitions of the web application 204. For example, and not by way of limitation, in some embodiments, one or more of the behavioral models 216 may include each of the screens of the web application 204 generated by the crawler and each of the transitions that caused each of the screens. In some embodiments, the model generator 208 may generate a relative layout model for one or more screens of the web application 204 that may be included in one or more of the behavioral models 216. In some embodiments, one or more of the behavioral models 216 may indicate an absolute position and/or size of one or more structural elements of the one or more screens of the web application 204, an image representation of one or more structural elements of the one or more screens of the web application 204, and/or a textual representation of one or more textual elements of the one or more screens of the web application 204.

In some embodiments of the present disclosure, the behavioral models 216 may be compared to determine whether there are one or more differences within the web application 204 when the web application 204 is executed on the different platforms 212. In some embodiments and as discussed in further detail below with respect to FIGS. 6 and 7, the relative layout models of the behavioral models 216 may be compared to determine if there is a difference in the one or more relationships between elements of a screen of the web application 204 when the web application 204 is executed on the different platforms 212 associated with the respective behavioral models 216. In the same or alternative embodiments, the behavioral models 216 may be compared to determine differences between the absolute position and/or size of one or more structural elements of the screen the web application 204, the image representation of one or more structural elements of the screen of the web application 204, the textual representation of one or more textual elements of the screen of the web application 204, and/or the behavior of one or more actionable elements of the screen of the web application 204 when the web application 240 is executed on the different platforms associated with the respective behavioral models 216.

A more detailed description of the generation of a behavioral model that may indicate the screens of a web application through a series of states of a state machine is given in U.S. application Ser. No. 12/723,568 filed on 12 Mar. 2010, entitled "DETERMINING DIFFERENCES IN AN EVENT-DRIVEN APPLICATION ACCESSED IN DIFFERENT CLIENT-TIER ENVIRONMENTS," U.S. application Ser. No. 13/248,027 filed on 28 Sep. 2011, entitled "INCREMENTAL VISUAL COMPARISON OF WEB BROWSER SCREENS," and U.S. application Ser. No. 13/248,030 filed on 28 Sep. 2011, entitled "USING MACHINE LEARNING TO IMPROVE VISUAL COMPARISON," which are all incorporated herein by reference in their entireties. Additionally, the above-referenced applications give a more detailed description of the determination of the differences between the absolute position and/or size of one or more structural elements of the web application 204, the image representation of one or more structural elements of the web application 204, the textual representation of one or more textual elements of the web application 204, and/or the behavior of one or more actionable elements of the web application 204 when the web application 204 is executed on the different platforms associated with the respective behavioral models 216.

As mentioned above, the behavioral models 216 may each include a relative layout model of one or more screens of the web application 204. The relative layout models of the one or more screens of the web application 204 may be based on a layout of the elements of the one or more screens of the web application 204 when the web application 204 is executed on a particular platform 212. The relative layout models may represent the relative arrangement of elements on the layout of the screen of the web application 204 per its execution on a particular platform 212.

Figure 3:
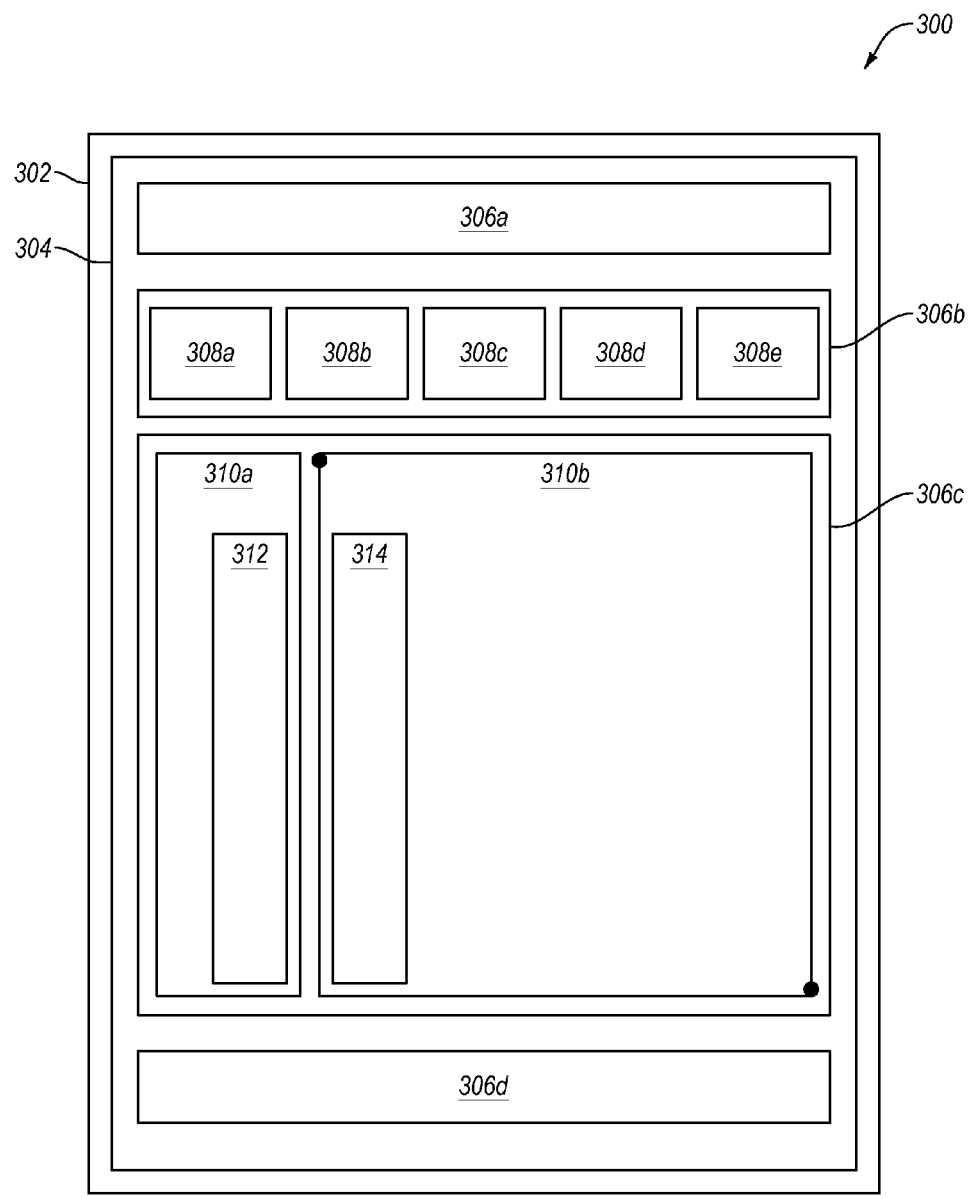
FIG. 3 illustrates an example layout of a screen of a web application.

FIG. 3 illustrates an example layout 300 of a screen of a web application (e.g., the web applications 112 and 204 of FIGS. 1 and 2, respectively) when the web application is executed on a platform (e.g., the platforms 114 and 212 of FIGS. 1 and 2, respectively), arranged in accordance with at least some embodiments described herein. The layout 300 may include multiple elements that may be associated with objects included in a DOM of the associated web application. In the illustrated embodiment, the layout 300 may include a first element 302 that may include a second element 304 located immediately inside of it such that the first element 302 may be referred to as a parent element with respect to the second element 304 and the second element 304 may be referred to as a child element of the first element 302.

The second element 304 may include third elements 306a, 306b, 306c, and 306d located immediately inside of the second element 304 such that the second element 304 may be referred to as a direct parent element of the third elements 306a-306d. Because the second element 304 is located within the first element 302 and the third elements 306a-306d are located within the second element 304, the first element 302 may be referred to as an ancestor of the third elements 306a-306d. Accordingly, the third elements 306a-306d may be referred to as descendants of the first element 302. Note that a parent/child relationship is a special case of the more general ancestor/descendant relationship, where the child is an immediate descendant of the parent and the parent is an immediate ancestor of the child. For simplicity of explanation, the discussion of ancestor/descendant relationships between the elements of the layout 300 is limited to parent/child relationships between the elements of the layout 300 with the understanding that one or more ancestor/descendant relationships may be present. Additionally, because the second element 304 in the illustrated embodiment of FIG. 3 is the parent of each of the third elements 306a-306d, the third elements 306a-306d may be referred to as sibling elements with respect to each other.

In the illustrated embodiment, the third element 306b may also be a parent to fourth elements 308a-308e, and the fourth elements 308a-308e may be sibling elements. The third element 306c may be a parent to fifth elements 310a and 310b and the fifth elements 310a and 310b may be sibling elements. Further, the fifth element 310a may be a parent to a sixth element 312 and the fifth element 310b may be a parent to a seventh element 314.

The different relationships of the elements with respect to each other may indicate where the different elements are located on the layout 300 and, thus, may indicate how the layout 300 is displayed. The different relationships of the elements with respect to each other may include one or more parent/child relationships, sibling relationships and/or one or more attributes further qualifying the relative position or arrangement of an element with respect to its parent and sibling elements. For example, a child element may be left-justified, right-justified, top-aligned, bottom-aligned and/or centered (with respect to the left and right edges and/or the top and bottom edges of the parent element) within its respective parent element. Additionally, sibling elements may have relative positions with respect to each other such as being organized within their respective parent element from the top to the bottom of the parent element, from the bottom to the top of the parent element, from the left to the right of the parent element, and/or from the right to the left of the parent element. Additionally, sibling elements may be bottom-edge aligned, top-edge aligned, left-edge aligned and/or right-edge aligned with respect to each other.

As way of example, in the illustrated embodiment, the second element 304 may be centered with respect to the top, bottom, left, and right edges of the first element 302. The third elements 306a-306d may be arranged from the top of the second element 304 to the bottom of the second element 304. The fourth elements 308a-308e may be arranged from the left to the right of the third element 306b. The fifth elements 310a and 310b may similarly be arranged from the left to the right of the third element 306c. Further, the sixth element 312 may be right justified and bottom-aligned with respect to the fifth element 310a. The seventh element 314 may be left-justified and bottom-aligned with respect to the fifth element 310b.

Figure 4:
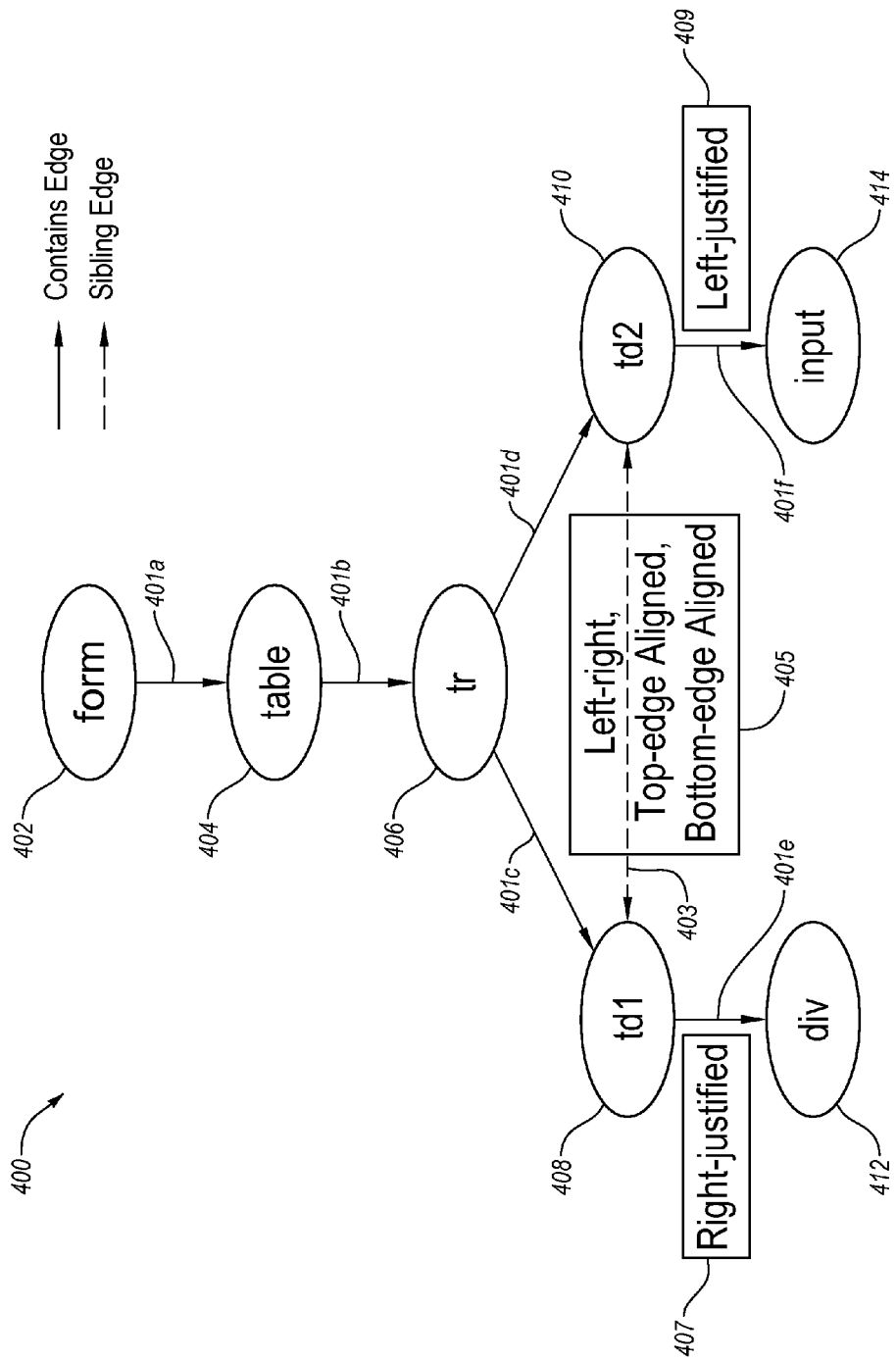
FIG. 4 illustrates an example of a relative layout model that may be based on the layout of FIG. 3.

As mentioned above, the layout 300 may be used to generate a relative layout model of the associated screen of web application. FIG. 4 illustrates an example of a relative layout model 400 that may be based on the layout 300 of FIG. 3, arranged in accordance with at least some embodiments described herein. The relative layout model 400 may represent the relationship between multiple elements of the layout 300. This relationship may pertain to the relative position and arrangement of these elements with respect to each other on the layout of the screen. For simplicity of explanation, the relative layout model 400 does not illustrate the relationship between all the elements of the layout 300. However, in some embodiments a relative layout model may be generated for the layout 300 that may illustrate the relationship between more elements of the layout 300 than illustrated in the relative layout model 400. For example, a relative layout model may be generated for the layout 300 that may illustrate the relationship between all the elements of the layout 300.

The relative layout model 400 may include one or more nodes that may each represent an element of the layout 300. For example, the first element 302 of FIG. 3 may be associated with a DOM object labeled "form" and a node 402 of the relative layout model 400 may represent the first element 302 of the layout 300. The second element 304 of FIG. 3 may be associated with a DOM object labeled "table" and a node 404 of the relative layout model 400 may represent the second element 304 of the layout 300.

As mentioned above, and illustrated in FIG. 3, the second element 304 may be included within the first element 302 of the layout 300 such that the first element 302 may be a parent of the second element 304. Accordingly, the relative layout model 400 may include a contains edge 401a between the node 402 and the node 404 that may indicate the parent/child relationship between the first element 302 and the second element 304. Additionally, the node 402 may thus also be referred to as a parent node of the node 404.

The relative layout model 400 may include a node 406 that may represent the third element 306c of FIG. 3, which may be associated with a DOM object labeled "tr." The relative layout model 400 may include a contains edge 401b between the nodes 404 and 406 that may indicate the parent/child relationship between the second element 304 and the third element 306c. The node 404 may thus be a parent node of the node 406.

The fifth element 310a of FIG. 3 may be associated with a DOM object labeled "td1" and a node 408 of the relative layout model 400 may represent the fifth element 310a of the layout 300. The relative layout model 400 may also include a node 410 that may represent the fifth element 310b of FIG. 3, which may be associated with a DOM object labeled "td2." The relative layout model 400 may include a contains edge 401c that may be between the nodes 406 and 408 that may indicate the parent/child relationship between the third element 306c and the fifth elements 310a. The relative layout model 400 may additionally include a contains edge 401d that may be between the nodes 406 and 410 that may indicate the parent/child relationship between the third element 306c and the fifth elements 310a and 310b, respectively. The node 406 may accordingly be referred to as a parent node of the nodes 408 and 410.

Additionally, as mentioned previously and illustrated in FIG. 3, the fifth elements 310a and 310b may be considered sibling elements. Accordingly, the relative layout model 400 may include a sibling edge 403 that may indicate the sibling relationship between the fifth elements 310a and 310b. The nodes 408 and 410 may thus also be referred to as sibling nodes.

The relative layout model 400 may include a node 412 that may represent the sixth element 312 of FIG. 3, which may be associated with a DOM object labeled "div." Additionally, the seventh element 314 of FIG. 3 may be associated with a DOM object labeled "input" and a node 414 of the relative layout model 400 may represent the seventh element 314 of the layout 300. The relative layout model 400 may include contains edges 401e and 401f that may respectively represent the parent/child relationship between the fifth element 310a and the sixth element 312, and the parent/child relationship between the fifth element 310b and the seventh element 314 of the layout 300. The node 408 may thus be a parent node of the node 412 and the node 410 may thus be a parent node of the node 414.

The relative layout model 400 may also indicate one or more attributes further qualifying the relative position or arrangement of an element of the layout 300 with respect to another element of the layout 300 that may be related to the element through a parent/child or sibling relationship. In the illustrated embodiment, the relative layout model 400 may include an attribute field 405 that may be associated with the sibling relationship between the fifth elements 310a and 310b of the layout 300, which may be respectively represented by the nodes 408 and 410 of the relative layout model 400. The attribute field 405 may indicate one or more relative layout attributes of the fifth elements 310a and 310b of the layout 300 (represented by the nodes 408 and 410 of the relative layout model 400) with respect to each other. For example, in the illustrated embodiment, the attribute field 405 indicates that the fifth elements 310a and 310b may be arranged from left to right and may be top and bottom edge aligned.

The relative layout model 400 of the illustrated embodiment may also include an attribute field 407 that may be associated with the parent/child relationship between the fifth element 310a and the sixth element 312 of the layout 300, which may be respectively represented by the nodes 408 and 412 of the relative layout model 400. The attribute field 407 may indicate that the sixth element 312 of the layout 300 (represented by the node 412 of the relative layout model 400) may be right justified within the fifth element 310a of the layout 300 (represented by the node 408 of the relative layout model 400).

Further, the relative layout model 400 of the illustrated embodiment may include an attribute field 409 that may be associated with the parent/child relationship between the fifth element 310b and the seventh element 314 of the layout 300, which may be respectively represented by the nodes 410 and 414 of the relative layout model 400. The attribute field 409 may indicate that the seventh element 314 of the layout 300 (represented by the node 414 of the relative layout model 400) may be left-justified within the fifth element 310b of the layout 300 (as represented by the node 410 of the relative layout model 400).

Accordingly, the relative layout model 400 may indicate relationships between elements of the layout 300. These relationships may indicate relative positions of the elements with respect to each other as depicted on the layout 300, which may indicate an end-user experience of the screen and web application associated with the layout 300.

Modifications, additions, or omissions may be made to FIGS. 3 and 4 without departing from the scope of the present disclosure. For example, the number of elements included in the layout 300 may vary depending on the web application and those shown are for illustrative purposes only. Additionally, the number of elements and relative layout attributes represented by the relative layout model 400 may vary. For example, in some embodiments the relative layout model 400 may include more or fewer nodes representing the elements of the layout 300. Further, the relative layout model 400 may include more or fewer attribute fields. The attribute fields may also include more or fewer indications of the relative layout attributes between elements. Also, although the relative layout model 400 is described with respect to the layout 300, the relative layout model 400 may be generated for any suitable layout associated with any applicable screen of a web application. Further, the graphical representation of the relative layout model 400 is to illustrate concepts and the relative layout model 400 may be generated in any suitable form such as software code that may include the relationships illustrated in the graphical representation.

Figure 5:
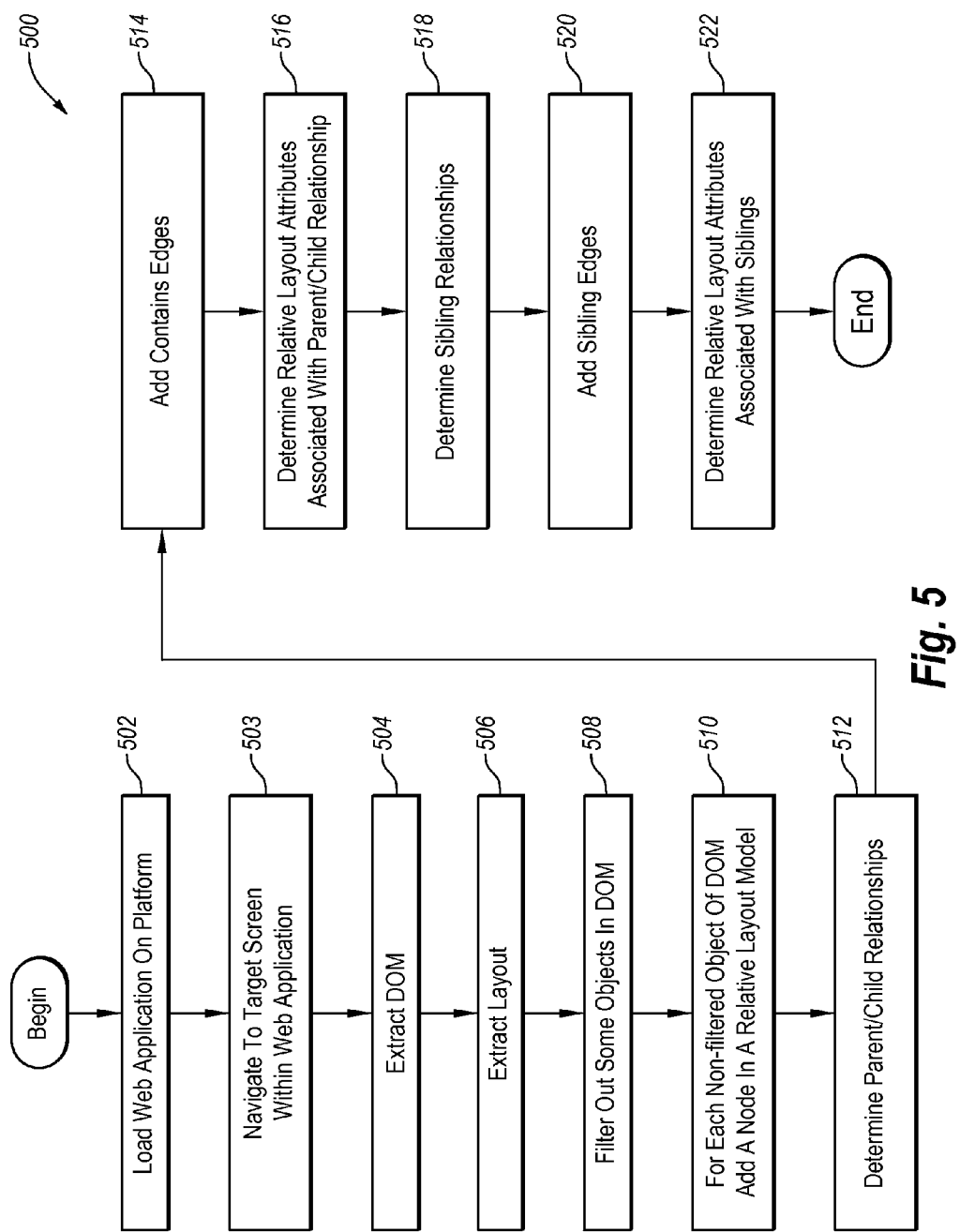
FIG. 5 illustrates an example method for generating a relative layout model.

FIG. 5 illustrates an example method 500 for generating a relative layout model (e.g., the relative layout model 400 of FIG. 4), arranged in accordance with at least some embodiments described herein. The method 500 may be implemented, in some embodiments, by a model generator, such as the model generator 208 of FIG. 2. For instance, the model generator 208 of the system 200 of FIG. 2 may be configured to execute computer instructions to perform operations for generating a relative layout model as represented by one or more of the blocks of the method 500. Although illustrated as discrete blocks, various blocks may be divided into additional blocks, combined into fewer blocks, or eliminated, depending on the desired implementation.

The method 500 may start, and at block 502, a web application may be loaded on a platform, such as a browser. At block 503, navigation actions may be performed on the loaded web application to reach a target screen of the web application within the platform. At block 504, a DOM associated with the target screen of the web application may be extracted. At block 506, a layout of the screen of the web application as executed by the platform may be extracted.

At block 508, one or more objects of the DOM may be filtered. In some embodiments, the filtered objects may be non-structural objects of the DOM such as styling or syntax objects. The non-filtered objects of the DOM may be associated with elements of the layout extracted in block 506. At block 510, a node may be added to a relative layout model for each non-filtered object of the DOM (associated with an element of the layout) such that each node may represent an element of the layout.

At block 512, the ancestor/descendant relationships between the elements of the layout extracted in block 506 may be determined. In some embodiments, the parent/child relationships may be determined at block 512. The parent/child relationships may be determined using any suitable method. For example, it may be determined which is the smallest element of the layout that includes another element such that the smallest element that includes the other element may be the parent to the other element.

In some embodiments, this determination may be made by performing an algorithm based on the following pseudo-code:

```
list computeParent(list V)
{
   parentList ← null;
   sort(V, f); //sort using function f
   while(not Empty(V)) {
      v ← removeLast(V);
      foreach-reverse w in V {
         if contains(w,v) {
            insert(parentList, (v,w));
            break; // break out of for each loop
         }
      }
   }
   return parentList;
}
```

In the above pseudo-code, the list "V" may include the elements of the layout that may be analyzed. In some embodiments, the list "V" may include the objects of the DOM that may not be filtered out in block 508. The sorting function "f" may sort in ascending order an area for each element "v" of the list "V" and may break ties based on the length of the X-path of each element "v". The function "notEmpty(V)" may return "true" if and only if the list "V" is not empty. The "foreach-reverse" function may traverse the list "V" in reverse order (i.e., from the last element to the first). The function "contains (w,v)" may return "true" if and only if the rectangle associated with an element "w" contains the element "v" in the layout view of the web application. Additionally, the function "insert(parentList, (v,w))" may insert a pair of elements "(v, w)" to denote a parent/child relationship between the elements "v" and "w." Accordingly, the above pseudo-code may be used to determine and index one or more parent/child relationships between elements of a layout of a screen of a web application.

Returning to method 500, at block 514, the contains edges may be added to the relative layout model based on the parent/child relationships determined in block 512. At block 516, the relative layout attributes associated with each parent/child relationship may be determined based on the layout. In some embodiments, the determined relative layout attributes may be included in one or more attribute fields associated with the parent/child nodes and/or the associated contains edges.

At block 518, sibling relationships between nodes may be determined. In some embodiments, the siblings may be determined based on the contains edges. For example, if two or more child nodes each have a contains edge between the associated child node and the same parent node, the child nodes may be siblings. At block 520, sibling edges may be added to the relative layout model based on the sibling relationships determined at block 518. At block 522, the relative layout attributes associated with siblings may be determined based on the layout. In some embodiments, the determined relative layout attributes may be included in one or more attribute fields associated with the siblings and/or associated sibling edges. Following block 522, the method 500 may end.

Therefore, the method 500 may be used to generate a relative layout model that may indicate relationships between elements of a layout of a screen a web application. These relationships may indicate relative positions of the elements with respect to each other as depicted on the layout, which may indicate an end-user experience of the screen and web application associated with the layout.

Modifications, additions, or omissions may be made to the method 500 without departing from the scope of the present disclosure. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

As mentioned earlier, a first relative layout model may be generated for a first layout of a screen of a web application when the web application is executed on a first platform and a second relative layout model may be generated for a second layout of the same screen of the web application when the web application is executed on a second platform. The first and second relative layout models may accordingly be compared to determine if there are any differences between the first and second relative layout models. The differences between the first and second relative layout models may indicate whether the screen (and thus end-user experience) of the web application may be different depending on the platform on which the web application is executed.

FIG. 6A illustrates an example relative layout model 600 of a screen of a web application when the web application is executed on a first platform, arranged in accordance with at least some embodiments described herein. FIG. 6B illustrates an example relative layout model 600' of the same screen of the web application associated with the relative layout model 600 of FIG. 6A when the web application is executed on a second platform, arranged in accordance with at least some embodiments described herein. The relative layout models 600 and 600' may be generated using any suitable method. In some embodiments, the relative layout models 600 and 600' may be generated based on the method 500 of FIG. 5.

The relative layout model 600 may include nodes 602, 604, 606, 608, 610, 612, and 614 that may each represent an element of the screen of web application when the web application is executed on the first platform. In some embodiments, the nodes of the relative layout model 600 may each be associated with an object of a DOM of the screen of the web application. In the illustrated embodiment, the nodes 602, 604, 606, 608, 610, 612, and 614 include the tag labels of the associated DOM objects, which may indicate the type of DOM object they represent.

The relative layout model 600' may similarly include nodes 602', 604', 606', 608', 610', 612', and 614' that may each represent an element of the same screen of the web application when the web application is executed on the second platform. Additionally, nodes 602', 604', 606', 608', 610', 612', and 614' may represent the same elements as the nodes 602, 604, 606, 608, 610, 612, and 614, respectively, of the relative layout model 600. Consequently the nodes 602', 604', 606', 608', 610', 612', and 614' may correspond to the nodes 602, 604, 606, 608, 610, 612, and 614, respectively, of the relative layout model 600. Accordingly, in some embodiments, the nodes of the relative layout model 600' may each be associated with the same objects of a DOM of the screen of the web application as their respective corresponding nodes of the relative layout model 600. In the illustrated embodiment, the nodes 602', 604', 606', 608', 610', 612', and 614' include the tag labels of the associated DOM objects, indicating the type of the DOM object they represent.

Additionally, the relative layout model 600 includes contains edges 601a-601f and the relative layout model 600' includes corresponding contains edges 601a'-601f' that may indicate parent/child relationships between the nodes of the relative layout models 600 and 600'. Further, the relative layout model 600 includes a sibling edge 603 and the relative layout model 600' includes a corresponding sibling edge 603', each indicating a sibling relationship between the nodes 608 and 610 and 608' and 610', respectively.

The relative layout model 600 may also include an attribute field 605 indicating relative layout attributes of the sibling elements associated with the nodes 608 and 610. In the illustrated embodiment, an attribute field 607 of the relative layout model 600 may indicate that the child element associated with the node 612 may be right justified within the parent element associated with the node 608. Further, in the illustrated embodiment, an attribute field 609 of the relative layout model 600 may indicate that the child element associated with the node 614 may be left-justified within the parent element associated with the node 610.

The relative layout model 600' may similarly include an attribute field 605' indicating relative layout attributes of the sibling elements associated with the nodes 608' and 610'. In the illustrated embodiment, an attribute field 607' of the relative layout model 600' may indicate that the child element of the layout associated with the node 612' may be right justified within the parent element of the layout associated with the node 608'. Further, in the illustrated embodiment, an attribute field 609' of the relative layout model 600' may indicate that the child element of the layout associated with the node 614' may be centered within the parent element of the layout associated with the node 610'. The attribute fields 605', 607' and 609' of the relative layout model 600' may correspond with the attribute fields 605, 607, and 609, respectively, of the relative layout model 600.

As mentioned above, the relative layout models 600 and 600' may be compared to determine whether there are any differences between the two models. Differences between the models may accordingly indicate differences in the relationships between elements of the same screen of the web application when the web application is executed on the first and second platforms—which may indicate differences in the end-user experience of the web application when the web application is executed on the first platform and the second platform. For example, a comparison between the attribute field 609 and its corresponding attribute field 609' may indicate a different relative layout attribute associated with the node 614 (left-justified) than the relative layout attribute associated with the corresponding node 614' (centered). Accordingly, the elements of the screen associated with the nodes 614 and 614' may be displayed differently such that the end-user experience of the web application may be different on the first platform as compared to the second platform.

In some embodiments, the determined differences between the relative layout models may be used to generate an error report that may indicate the differences between the end-user experiences of the web application when executed on the first platform as compared to when executed on the second platform. For example, an error report may be generated based on the comparison between the relative layout models 600 and 600'. The error report may consequently indicate the differences in the justification of the element associated with the nodes 614 and 614'.

Therefore, first and second relative layout models may be generated for a screen of a web application as executed on first and second platforms and the first and second relative layout models may be compared for differences. The differences between the first and second relative layout models may indicate differences in the end-user experience of the web application when the web application is executed on the first and second platforms. Also, in some embodiments, the differences may be included in an error report that may facilitate recognition of the differences in the end-user experience.

Figure 6:
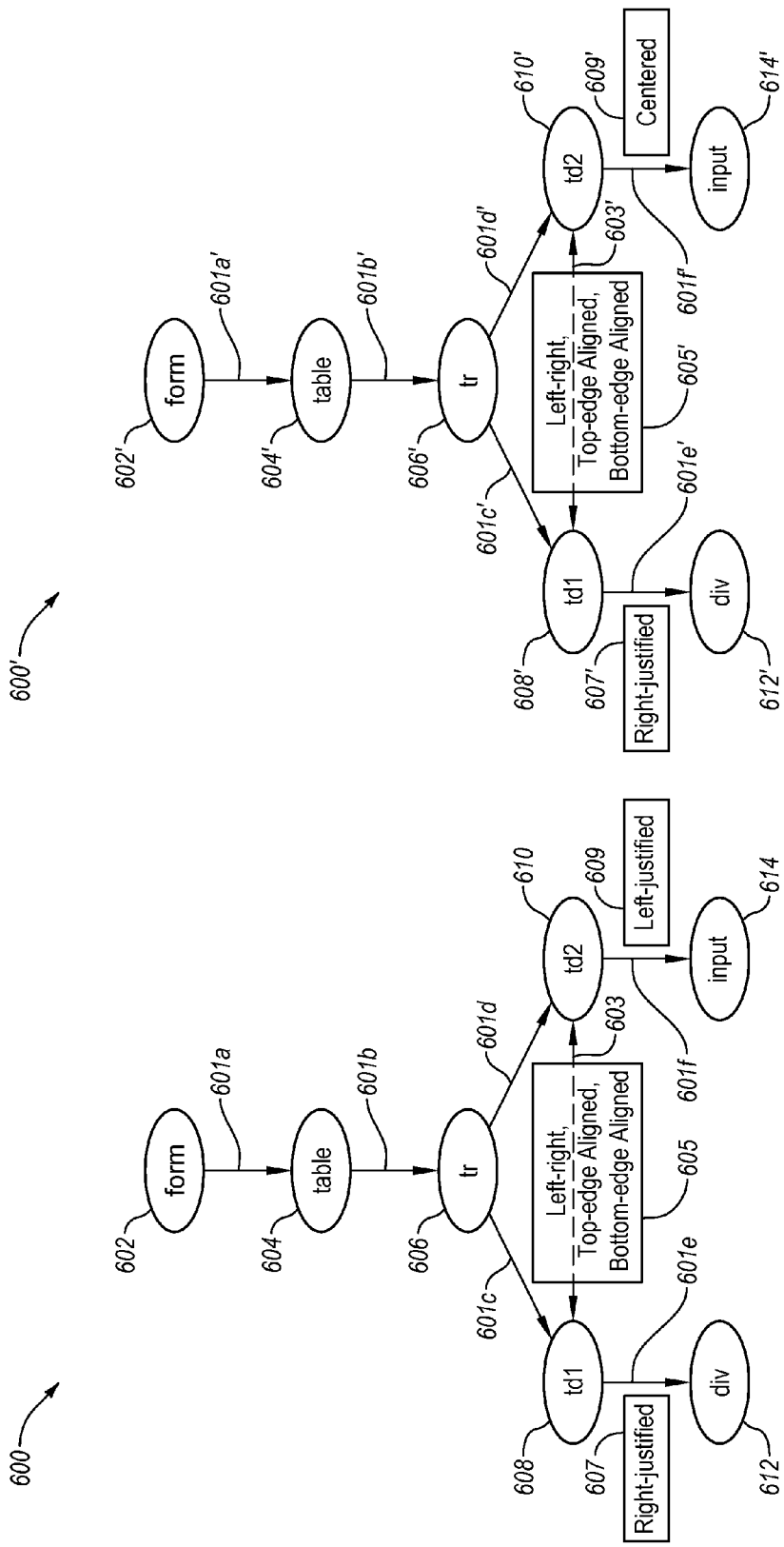
FIG. 6A illustrates an example relative layout model of a screen a web application when the web application is executed on a first platform.
FIG. 6B illustrates an example relative layout model of the same screen associated with the relative layout model of FIG. 6A when the web application is executed on a second platform.

Modifications, additions, or omissions may be made to FIG. 6 without departing from the scope of the present disclosure. For example, the relative layout models 600 and 600' may include more or fewer nodes than those depicted. Further, there may be more differences between the relationships between corresponding nodes and elements than those illustrated. For example, in some embodiments, different parent/child and/or sibling relationships may exist between corresponding nodes and elements. Further, different alignment relationships may exist between corresponding nodes and elements. The illustrated relative layout models 600 and 600' are merely to provide an illustration of the concepts described herein. Additionally, more than two relative layout models may be generated and compared to determine cross-platform inconsistencies between more than two platforms.

Figure 7:
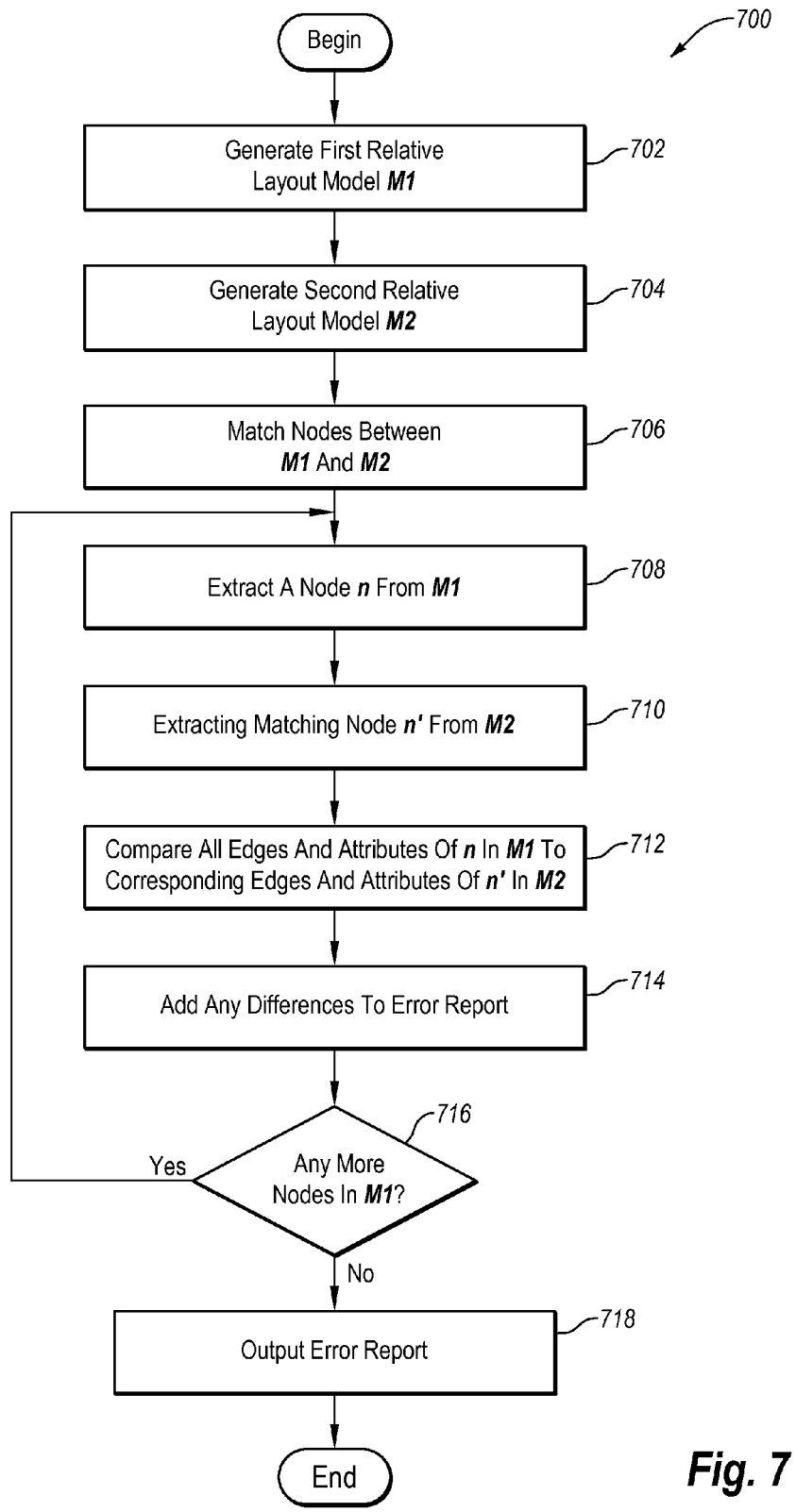
FIG. 7 illustrates an example method for comparing relative layout models.

FIG. 7 illustrates an example method 700 for comparing relative layout models (e.g., the relative layout models 600 and 600' of FIGS. 6A and 6B), arranged in accordance with at least some embodiments described herein. The method 700 may be implemented, in some embodiments, by a model generator, such as the model generator 208 of FIG. 2. For instance, the model generator 208 of the system 200 of FIG. 2 may be configured to execute computer instructions to perform operations for comparing relative layout models, as represented by one or more of the blocks of the method 700. Although illustrated as discrete blocks, various blocks may be divided into additional blocks, combined into fewer blocks, or eliminated, depending on the desired implementation.

The method 700 may start and at block 702 a first relative layout model ("M1") may be generated for a screen of a web application when the web application is executed on a first platform. As detailed above, the first layout model may be generated by determining one or more relationships between multiple elements of the screen, such as parent/child relationships, sibling relationships, and relative layout attributes. Accordingly, one or more first relationships between multiple elements of the screen of the web application when the web application is executed on the first platform may be determined at block 702.

At block 704 a second relative layout model ("M2") may be generated for the same screen of the web application when the web application is executed on a second platform. Similarly to the first layout model, the second layout model may be generated by determining one or more relationships between the same multiple elements of the screen as those included in the first relative layout model. Accordingly, one or more second relationships between the multiple elements of the screen of the web application when the web application is executed on the second platform may be determined at block 702. In some embodiments, the first and second relative layout models may be generated using the method 500 described above with respect to FIG. 5.

At block 706, nodes between the first relative layout model may be matched with corresponding nodes of the second relative layout model. The matching may be done using any suitable method. In some embodiments, a matching index may be generated at block 706 to match the nodes of the first relative layout model with the nodes of the second relative layout model. The matching index may be generated based on properties collected from the DOM of the web application.

For example, in some embodiments, the following properties may be collected from a first DOM of the web application when the web application is executed on the first platform and a second DOM of the web application when the web application is executed on the second platform (where a "DOM object" may correspond to a node of the first and second relative layout models):

tagname: Name of the label associated with the DOM object.
id: Unique identifier of a DOM object, if defined.
xpath: X-Path of the object in the DOM structure.
coord: Absolute screen position of the DOM object.
clickable: True if the DOM object has a click handler.
visible: True if the DOM object is visible.
zindex: DOM object's screen stack order, if defined.
hash: Checksum of the object's textual content, if any.

Shown below is one example of an algorithm "MatchIndex" for generating the matching index using the above-mentioned properties:

```
/* ComputeMatchIndex */
Input : a, b, where a ∈ DOM_i, b ∈ DOM_j
Output: ρ (Match Index)
1  begin
2  |    α ← 0.9
3  |    ρ, ρ_1, ρ_2 ← 0
4  |    if (α.id ≠ " ") ∧ a.id == b.id then
5  |    |    ρ ← 1
6  |    end
7  |    else   if a.tagname == b.tagname then
8  |    |    ρ1 ← (1 – LevenshteinDistance
   |    |         (a.xpath, b.xpath)/
   |    |         max(length(a.xpath),
   |    |         length(b.xpath)))
9  |    |    foreach prop in {"coord",
   |    |         "clickable", "visible", "zindex",
   |    |         "hash"} do
10 |    |    |    if α. prop == b.prop then
11 |    |    |    |    ρ2 ← ρ2 + 1
12 |    |    |    end
13 |    |    end
14 |    |    ρ2 ← ρ2/5
15 |    |    ρ ← (ρ1 * α + ρ2 * (1 – α))
16 |    end
17 |    return ρ
18 end
```

First, the MatchIndex algorithm checks whether (1) the id is defined, and (2) the two objects have the same id. If so, it identifies the objects as a perfect match, assigns "1" to the matching index ρ (line 5), and returns the value. (Because ids are manually assigned by developers and are unique, two objects with the same id are corresponding objects in the two DOM trees.) If the ids do not match or are not defined, the MatchIndex algorithm compares the tagnames of the objects (line 7). Although different objects may have the same tagname, corresponding objects may not have different tagnames. Therefore, if the tagnames are not equal, the default value of ρ, zero, is returned. Otherwise, the MatchIndex algorithm computes the matching index using some of the other properties of the objects.

For example, the MatchIndex algorithm may compute the normalized Levenshtein distance between the xpaths for the two objects and may assign a corresponding ones complement to $\rho_1$ (line 8). Then, the MatchIndex algorithm may compute the fraction of properties coord, clickable, visible, zindex, and hash that match between the two objects, and may assign the computed value to $\rho_2$ (lines 9-14). Finally, the MatchIndex algorithm may compute the matching index by adding $\rho_1$ and $\rho_2$, suitably weighted (line 15). The weighting uses a weighting factor α which is assigned a value between 0 and 1. Because both $\rho_1$ and $\rho_2$ are values between zero and one, the value of the resulting matching index, ρ, is also between zero and one. In some embodiments, α may be assigned a value greater than 0.5 and very close to 1 thereby weighting $\rho_1$ considerably more than $\rho_2$. The reason why $\rho_1$ is weighted considerably more than $\rho_2$ in the computation of ρ is because two corresponding objects should have the same, or at least a very similar, xpath. Intuitively, the other properties are only used to break a "tie" between two very likely matches. There may be only very rare cases in which $\rho_2$ plays any role in deciding a match. In other words, in the absence of developer-defined ids for the nodes, the nodes' xpaths are a reliable indication of whether two nodes match.

Therefore, the "MatchIndex" algorithm may be used to determine which nodes of the first relative layout model and the second relative layout model may correspond to each other.

Returning to the method 700, at block 708, a node "n" may be extracted from the first relative layout model. At block 710, a corresponding node "n'" that may correspond with the node n may be extracted from the second relative layout model. In some embodiments, the corresponding node n' may be determined as corresponding to the node n based on the matching performed in block 706. For example, the corresponding node n' may be determined as corresponding to the node n based on a matching index.

At block 712, all the edges and relative layout attributes associated with the node n may be compared with the edges and relative layout attributes associated with the node n'. As mentioned earlier, the edges and relative layout attributes associated with the node n may indicate one or more relationships between the element associated with the node n and other elements of the screen of the web application. Similarly, the edges and relative layout attributes associated with the node n' may indicate one or more relationships between the corresponding element associated with the node n' and other elements of the screen of the web application. Accordingly, the comparison may be made to determine whether there are one or more differences in one or more relationships between the element represented by the node n and other elements of the screen and one or more relationships between the corresponding element represented by the node n' and the other elements of the screen.

At block 714, any differences determined in block 712 may be added to an error report associated with executing the web application on the first platform and the second platform. If there are differences, the error-report may accordingly indicate one or more cross-platform inconsistencies of the web application between the first platform and the second platform based on the differences determined at block 712.

At block 716, it may be determined whether there are any more nodes in the first relative layout model that have not been compared with corresponding nodes of the second relative layout model. If there are more nodes that may be compared, the method 700 may return to block 708 and blocks 708-714 may be repeated for a new set of nodes. If there are not any more nodes that may be compared, the method 700 may proceed to block 718. At block 718, the error report may be outputted and following block 718 the method 700 may end.

Therefore, the method 700 may be used for comparing relative layout models of a screen of a web application where the relative layout models are associated with the web application being executed on different platforms. Such a comparison may thus be used to determine one or more differences between one or more relationships of elements of the screen of the web application with respect to each other when the web application is executed on the first platform as compared to when the web application is executed on the second platform.

Modifications, additions, or omissions may be made to the method 700 without departing from the scope of the present disclosure. For example, one skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Additionally, in some embodiments, the first and second relative layout models may each be included in first and second behavioral models, respectively. The first and second behavioral models may each indicate one or more screens associated with the web application and the first and second relative layout models may be generated for one or more of the screens.

Further, the behavioral models may also indicate an absolute position and/or size of one or more structural elements of the one or more screens of the web application, an image representation of one or more structural elements the one or more screens of the web application, a textual representation of one or more textual elements of the one or more screens of the web application, and/or a behavior of one or more actionable elements of the one or more screens of the web application. The behavioral models may thus be compared to determine one or more differences between the absolute position and/or size of one or more structural elements of the one or more screens, the image representation of one or more structural elements of the one or more screens, the textual representation of one or more textual elements of the one or more screens, and/or the behavior of one or more actionable elements of the one or more screens when the web application is executed on the different platforms associated with the respective behavioral models.

Also, more than two relative layout models and/or behavioral models of a web application associated with more than two platforms may be generated and compared. Accordingly, method 700 may be used to determine cross-platform differences between any number of platforms.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the disclosure.

What is claimed is:

1. A method for detecting a cross-platform difference of a web application comprising:

generating a first relative layout model based on a first relationship between a plurality of elements of a screen of a web application when the web application is executed on a first platform, wherein the first relative layout model indicates the first relationship and the first relationship includes a first parent and child relationship between two or more elements of the plurality of elements, a first sibling relationship between two or more elements of the plurality of elements, a first left to right order of a first left to right arrangement of two or more elements of the plurality of elements, and a first top to bottom order of a first top to bottom arrangement of two or more of the plurality of elements;

generating a second relative layout model based on a second relationship between the plurality of elements of the screen of the web application when the web application is executed on a second platform, wherein the second relative layout model indicates the second relationship and the second relationship includes a second parent and child relationship between two or more elements of the plurality of elements, a second sibling relationship between two or more elements of the plurality of elements, a second left to right order of a second left to right arrangement of two or more elements of the plurality of elements, and a second top to bottom order of a second top to bottom arrangement of two or more of the plurality of elements;

generating a first behavioral model of the web application when the web application is executed on the first platform, the first behavioral model including the first relative layout model and indicating, when the web application is executed on the first platform, one or more of the following: a first absolute position of one or more structural elements of the screen of the web application, a first absolute size of the one or more structural elements of the screen of the web application, a first image representation of one or more of the structural elements of the screen of the web application, a first textual representation of one or more textual elements of the screen of the web application, and a first behavior of one or more actionable elements of the screen of the web application;

generating a second behavioral model of the web application when the web application is executed on the second platform, the second behavioral model including the second relative layout model and indicating, when the web application is executed on the second platform, one or more of the following: a second absolute position of the one or more structural elements of the screen of the web application, a second absolute size of the one or more structural elements of the screen of the web application, a second image representation of the one or more of the structural elements of the screen of the web application, a second textual representation of the one or more textual elements of the screen of the web application, and a second behavior of the one or more actionable elements of the screen of the web application; and determining a difference between the first behavioral model and the second behavioral model that includes determining a difference between the first relationship and the second relationship based on a comparison of the first relative layout model with respect to the second relative layout model.

2. The method of claim 1, wherein at least one of the first relationship and the second relationship is associated with an alignment of one of the plurality of elements with respect to another of the plurality of elements.

3. The method of claim 1, further comprising indicating a cross-platform inconsistency of the web application between the first platform and the second platform based on the difference between the first relationship and the second relationship.

4. The method of claim 1, wherein:
the first behavioral model includes a first plurality of screens of the web application when the web application is executed on the first platform;
generating the first relative layout model includes generating the first relative layout model for one or more of the first plurality of screens;
the second behavioral model includes a second plurality of screens of the web application; and
generating the second relative layout model includes generating the second relative layout model for one or more of the second plurality of screens.

5. The method of claim 1, further comprising generating a matching index to match an element of the plurality of elements associated with the first relative layout model to a corresponding element of the plurality of elements associated with the second relative layout model.

6. The method of claim 1, further comprising indicating a cross-platform inconsistency of the web application between the first platform and the second platform based on the difference between the first behavioral model and the second behavioral model.

7. Non-transitory computer-readable storage media configured to store computer instructions that, in response to being executed, cause a system to perform operations, the operations comprising:

generating a first relative layout model based on a first relationship between a plurality of elements of a screen of a web application when the web application is executed on a first platform, wherein the first relative layout model indicates the first relationship and the first relationship includes a first parent and child relationship between two or more elements of the plurality of elements, a first sibling relationship between two or more elements of the plurality of elements, a first left to right order of a first left to right arrangement of two or more elements of the plurality of elements, and a first top to bottom order of a first top to bottom arrangement of two or more of the plurality of elements;

generating a second relative layout model based on a second relationship between the plurality of elements of the screen of the web application when the web application is executed on a second platform, wherein the second relative layout model indicates the second relationship and the second relationship includes a second parent and child relationship between two or more elements of the plurality of elements, a second sibling relationship between two or more elements of the plurality of elements, a second left to right order of a second left to right arrangement of two or more elements of the plurality of elements, and a second top to bottom order of a second top to bottom arrangement of two or more of the plurality of elements;

generating a first behavioral model of the web application when the web application is executed on the first platform, the first behavioral model including the first relative layout model and indicating, when the web application is executed on the first platform, one or more of the following: a first absolute position of one or more structural elements of the screen of the web application, a first absolute size of the one or more structural elements of the screen of the web application, a first image representation of one or more of the structural elements of the screen of the web application, a first textual representation of one or more textual elements of the screen of the web application, and a first behavior of one or more actionable elements of the screen of the web application;

generating a second behavioral model of the web application when the web application is executed on the second platform, the second behavioral model including the second relative layout model and indicating, when the web application is executed on the second platform, one or more of the following: a second absolute position of the one or more structural elements of the screen of the web application, a second absolute size of the one or more structural elements of the screen of the web application, a second image representation of the one or more of the structural elements of the screen of the web application, a second textual representation of the one or more textual elements of the screen of the web application, and a second behavior of the one or more actionable elements of the screen of the web application; and determining a difference between the first behavioral model and the second behavioral model that includes determining a difference between the first relationship and the second relationship based on a comparison of the first relative layout model with respect to the second relative layout model.

8. The non-transitory computer-readable storage claim 7, wherein at least one of the first relationship and the second relationship is associated with an alignment of one of the plurality of elements with respect to another of the plurality of elements.

9. The non-transitory computer-readable storage claim 7, wherein the operations further comprise indicating a cross-platform inconsistency of the web application between the first platform and the second platform based on the difference between the first relationship and the second relationship.

10. The non-transitory computer-readable storage claim 7, wherein:
   the first behavioral model includes a first plurality of screens of the web application when the web application is executed on the first platform;
   generating the first relative layout model includes generating the first relative layout model for one or more of the first plurality of screens;
   the second behavioral model includes a second plurality of screens of the web application; and
   generating the second relative layout model includes generating the second relative layout model for one or more of the second plurality of screens.

11. The non-transitory computer-readable storage claim 7, wherein the operations further comprise generating a matching index to match an element of the plurality of elements associated with the first relative layout model to a corresponding element of the plurality of elements associated with the second relative layout model.

12. The non-transitory computer-readable storage claim 7, wherein the operations further comprise indicating a cross-platform inconsistency of the web application between the first platform and the second platform based on the difference between the first behavioral model and the second behavioral model.

* * * * *